United States Patent [19]

Kunz

[11] Patent Number: 5,047,277
[45] Date of Patent: Sep. 10, 1991

[54] NESTED HONEYCOMB STRUCTURES AND PRODUCTION METHOD

[75] Inventor: Bernard P. Kunz, Albuquerque, N. Mex.

[73] Assignee: Core Craft Technologies, Inc., Albuquerque, N. Mex.

[21] Appl. No.: 377,728

[22] Filed: Jul. 10, 1989

[51] Int. Cl.$^5$ .............................................. B32B 3/12
[52] U.S. Cl. .................... 428/116; 428/117; 428/119
[58] Field of Search ............... 428/34.1, 73, 116, 117, 428/118, 119, 181

[56] References Cited

U.S. PATENT DOCUMENTS

| | | | |
|---|---|---|---|
| 2,101,836 | 12/1937 | Benedict | 428/181 X |
| 2,475,789 | 7/1949 | Kunz | 156/260 |
| 2,477,852 | 8/1949 | Bacon | 428/116 |
| 2,501,180 | 3/1950 | Kunz | 428/182 X |
| 2,644,777 | 7/1953 | Havens | 428/116 |
| 3,103,460 | 9/1963 | Picket | 428/118 |
| 3,204,667 | 9/1965 | Zahorski | 428/178 X |
| 3,265,556 | 8/1966 | Hungerford et al. | 428/215 |
| 3,317,363 | 5/1967 | Weber | 428/187 X |
| 3,553,065 | 1/1971 | Stumpf | 428/113 |
| 3,565,740 | 2/1971 | Lazar | 428/76 |
| 3,622,430 | 11/1971 | Jurisich | 428/116 X |
| 3,756,904 | 9/1973 | Fredericks | 428/116 X |
| 3,841,738 | 10/1974 | Caplan | 350/614 |
| 3,887,418 | 6/1975 | Jurisich | 428/118 X |
| 3,912,573 | 10/1975 | Kunz | 156/471 |
| 3,975,882 | 8/1976 | Walter | 428/116 X |
| 4,228,943 | 10/1980 | Tanabe et al. | 428/116 X |
| 4,232,658 | 11/1980 | Gessford | 428/116 X |
| 4,271,219 | 6/1981 | Brown | 428/116 |
| 4,816,091 | 3/1989 | Miller | 156/42 |
| 4,821,915 | 4/1989 | Mayer | 220/441 |

FOREIGN PATENT DOCUMENTS

| | | | |
|---|---|---|---|
| 751885 | 1/1967 | Canada | 428/116 |
| 3238370 | 4/1984 | Fed. Rep. of Germany | 428/116 |

OTHER PUBLICATIONS

Plastic Honeycomb Panels Form 35-Ft Tank, May 26, 1965 Design News, W. E. Worth, Jr., Associate Editor.
John Otts, Dan Sallis, "The Custom Engineering Parabolic Glass Reflector for the Sandia Prototype Solar Collector", Aug., 1981.

Primary Examiner—Henry F. Epstein
Attorney, Agent, or Firm—Sheridan, Ross & McIntosh

[57] ABSTRACT

A nested fiberglass structure (10) comprises a plurality of strips (66) each in the shape of a sinusoidal wave (20). The waves (20) have peaks (22) and valleys (24) which have equal amplitudes about a central axis (26). A positioning string (32) is placed over the peaks (22) and into the valleys (24) to provide a guide for the depth of penetration of adjacent strips during nesting of the strips (66). The structure (10) may be formed on an apparatus for manufacturing (46) which forms a continuous web (48) into the strips (66) and nests the strips (66) into the structure (10). The structure (10) may then be wound onto a reel (154) for fabrication into a cylindrical structure (34). The apparatus (136) spirally winds the nested structure (10) around a mandrel (182) to form the cylindrical structure (34).

11 Claims, 7 Drawing Sheets

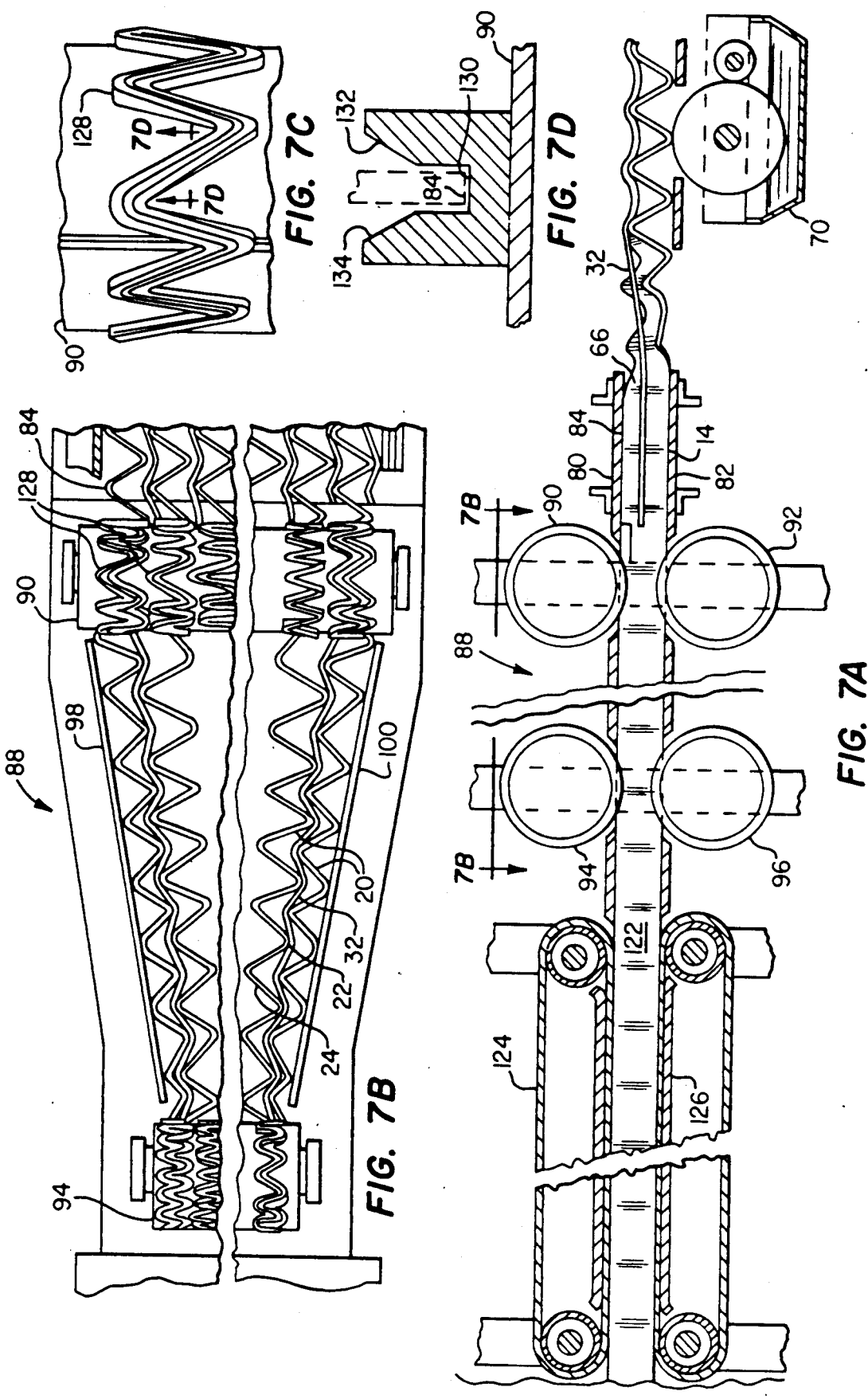

NESTED HONEYCOMB STRUCTURES AND PRODUCTION METHOD

TECHNICAL FIELD OF THE INVENTION

This invention relates in general to fiberglass honeycomb structures, and in particular to nested honeycomb structures and methods for producing the same.

BACKGROUND OF THE INVENTION

The fabrication and use of honeycomb fiberglass structures is well-developed. Honeycomb structures are used for many different purposes such as for forming roofing panels, walls, doors and etc. Because of the lightweight characteristic of fiberglass and the strength of honeycomb designs, such structures have been proven to be very useful in many construction applications.

Typically, fiberglass honeycomb structures combine a plurality of wave shaped fiberglass strips formed into a panel with a linear support sheet attached between each wave shaped strip. The plurality of wave-shaped strips are then fixed together to form panels or sections by applying cover skins to one or both side edges thereof. Such structures are disclosed, for example, in Kunz U.S. Pat. No. 2,501,180, Mar. 21, 1950; Picket U.S. Pat. No. 3,103,460, Sept. 10, 1963; and Bacon U.S. Pat. No. 2,477,852, Aug. 2, 1949. While these structures are generally adequate for many construction purposes, shear planes are typically formed between each fiberglass strip due to the method of assembly. As with any structure, failures occur first at the weakest point and, therefore, any stress on the honeycomb structure will tend to be concentrated at the shear planes resulting in destruction of the panels along the shear planes. Thus, there is a need for a structure design, and a method and apparatus for constructing honeycomb structures that avoid the shear plane weaknesses of the prior art.

SUMMARY OF THE INVENTION

The present invention comprises a nested honeycomb structure and production method which eliminates or greatly reduces the problems associated with prior honeycomb structures. The present invention provides the fabrication of nested honeycomb fiberglass structures with improved flexibility and strength.

In accordance with one aspect of the invention, a nested honeycomb fiberglass panel is formed. The panel comprises a plurality of longitudinal strips, each resembling a general sinusoidal wave. The sinusoidal waves have uniform periods with equal amplitudes forming peaks and valleys. The strips are arranged into an overlapping nested configuration in which peaks and valleys of each strip extend into peaks and valleys of adjacent strips.

In one embodiment of the present invention, strings are positioned along the sinusoidal waves during production such that the strings rest on each peak and sag into each valley therebetween. When a second sinusoidal wave is placed over the first, the string provides a positioning guide for the nesting of the two waves. It has been found through testing that an angle formed between a projection of the forward and reverse slopes of each peak and valley should be less than 80° with the radius of curvature of each peak and valley less than 30% of the peak to valley height to obtain the optimum strength and flexibility combination needed to bend the nested waves about their longitudinal axis.

The individual nested honeycomb structures may be used to fabricate more complex structures such as a cylindrical structure. Due to the flexibility and strength of the nested sinusoidal waves, it is possible to bend the honeycomb structures about a longitudinal axis to form a cylinder. The cylinder comprises an inner first wall fixed to the nested honeycomb structures. An external second wall is fixed to the honeycomb structure distal the inner first wall to provide added strength and to form a double-walled cylindrical structure.

To form the nested honeycomb structures, a production line produces fluted corrugations and positions the strings therein. While the corrugations are still wet with resin, the strings are placed along a longitudinal axis thereof in an approximate center corresponding to the final width of each strip. After drying, the corrugation is slit into the appropriate widths to form strips for construction of the panels.

The strips are then twisted 90° about their longitudinal axis to place them on edge and are positioned to overlap with the strings serving as a guide for the depth of the peak and valley penetration. After the strips have been nested, they go to a sheeting device which places a relatively thin covering skin along one edge thereof for ease of handling. After the skin has been applied, the panels are wound into reels for subsequent use.

The wound reels may then be placed on a wrapping apparatus to form a cylindrical structure. A mandrel is provided as a template for formation of the cylindrical structure. The wrapping apparatus spirally winds the panel around the mandrel until the mandrel is completely covered. A relatively thick outer sheet is subsequently wound around the exterior surface of the panels to provide added strength. The cylindrical structure may be sized for any appropriate length and diameter for use, for example, as a pipe section or a tank.

It is a technical advantage of the present invention that the tendency to form shear planes between each wave in the honeycomb structure has been greatly reduced. It is further technical advantage of the present invention that the waves are nested to form panels that are both flexible and strong. It is another technical advantage that the nested panels may be formed on a fully automated production line at the desired length width. The panels may be easily rolled into reels for use with a cylindrical structure forming apparatus. Cylindrical structures formed from the panels are superior in strength and fluid retention due to the improved design of the present invention. Thus, it is a technical advantage of the present invention that cylindrical structures may be formed in a cost efficient manner with strong flexible panels of nested honeycomb fiberglass. Further advantages will be obvious to those skilled in the art.

BRIEF DESCRIPTION OF THE DRAWINGS

For a more complete understanding of the present invention and for further advantages thereof, reference is now made to the following Detailed Description taken in conjunction with the accompanying Drawings in which:

FIG. 7A is a cross-sectional view of Section 7A—7A of FIG. 4;

FIG. 7B is a top plan view of section 7B—7B of FIG. 7A;

FIG. 7C is a plan view of the horizontal indexing roll of FIG. 7A;

FIG. 7D is a cross-sectional view of one of the channels of the roll of FIG. 7C;

DETAILED DESCRIPTION OF THE INVENTION

Figure 1:
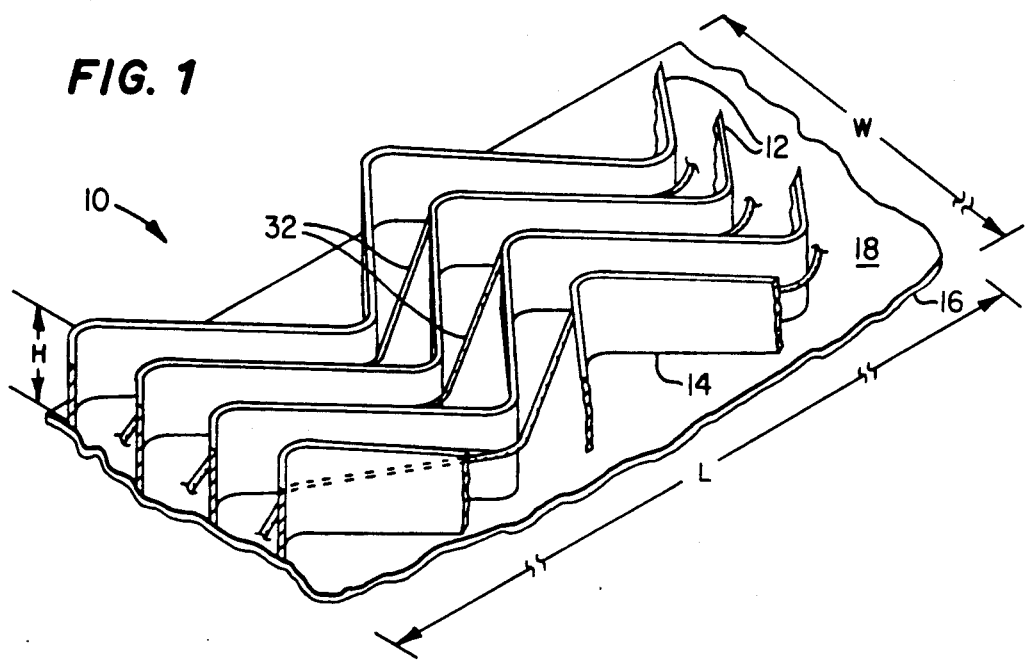
FIG. 1 is an isometric view of a portion of a nested honeycomb structure constructed in accordance with the present invention.

In FIGS. 1-10, like items are identified by like and corresponding numerals for ease of reference. Referring first to FIG. 1, an isometric view of a nested honeycomb structure formed in accordance with the preferred embodiment of the present invention is generally identified by the reference numeral 10. The structure 10 comprises at least two corrugated strips 12 which may comprise, for example, fiberglass sheets shaped into general sinusoidal waves, as will be subsequently described in greater detail. The strips 12 are separated by a positioning string 32 and are fixed at a first edge 14 to a relatively thin support skin 16. The skin 16 may comprise, for example, fiberglass and is preferably as thin as possible to allow handling of the structure 10.

The structure 10 has a width W which may be, for example, from 18 to 30 inches. The corrugated strip 12 may have a height H of any appropriate dimension, such as 1-4 inches and a predetermined length L. It should be noted, that the strips 12 are at least partially embedded into the surface 18 of the skin 16 to reduce the likelihood of the formation of shear planes that would occur at their juncture should embedding not take place.

Figure 2A:
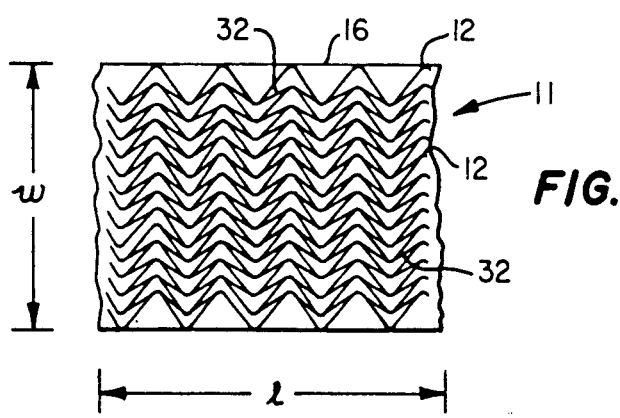
FIGS. 2A-B are top plan views of the structure of FIG. 1.
Figure 2B:
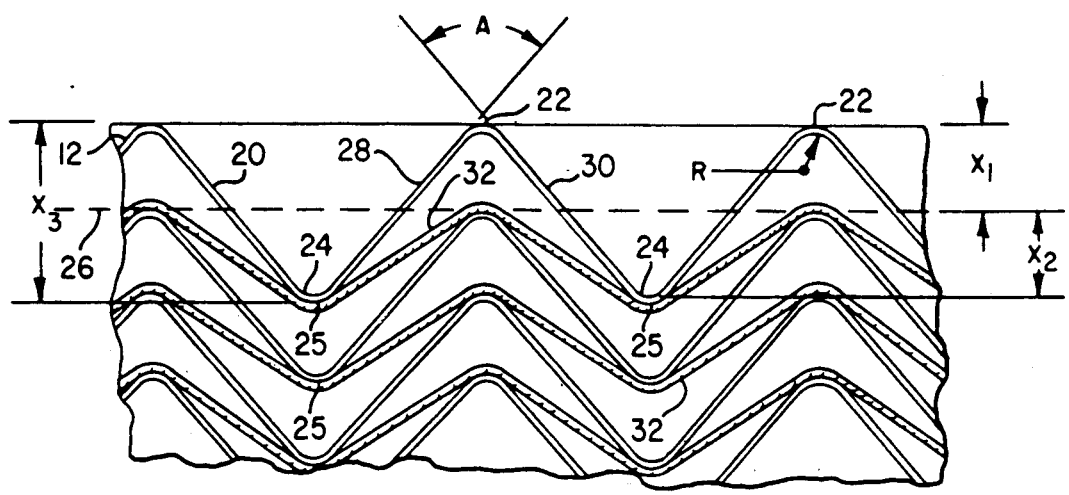

Referring to FIGS. 2A and 2B, the structure 10 is illustrated in a top plan view. FIG. 2A shows a section 11 of the structure 10 having a width w and a length 1. A plurality of the strips 12 are arranged on the skin 16. As can be seen from FIG. 2B, each corrugated strip 12 is generally in the form of a sinusoidal wave 20. Each wave 20 has a plurality of peaks 22 and valleys 24 which are of equal amplitude with reference to a centerline passing therethrough as indicated by a dashed line 26. Therefore, the distance $X_1$ (distance from the centerline 26 to the peak 22) is equal to the distance $X_2$ (distance from the centerline 26 to the bottom 25 of valley 24), and the distance $X_1$ plus the distance $X_2$ equals a cell height $X_3$. Each peak 22 and valley 24 has a radius of curvature R which is preferably less than 30% of the cell height $X_3$. Additionally, an angle A formed by an intersection of outwardly directed projections of a forward slope 28 and a reverse slope 30 of each peak 22 (and likewise for each valley 24) is preferably less than 80°. It has been found through testing that the angle A should be less than 80° and the radius of curvature R should be less than 30% of the cell height $X_3$ to obtain the optimum strength and flexibility combination needed to bend the structure 10 about the length L.

Between each wave 20 there may be a non-strechable positioning string 32 which is approximately along a central longitudinal axis of each wave 20. The string 32 is provided to serve as a guide for the depth of penetration of the peaks 22 and the valleys 24 of the waves 20 when they are arranged into the nested configuration as shown in FIGS. 1 and 2. It is important to provide at least some degree of nesting, for example, 10-60% of the cell height $X_3$, in order to reduce the likelihood of the formation of shear planes between each wave 20. In the preferred embodiment the penetration is approximately 10% of the height $X_3$ for optimum flexibility and strength. If the waves 20 are too close together, some flexibility will be lost and if the waves 20 are too far apart, some strength will be lost.

Figure 3:
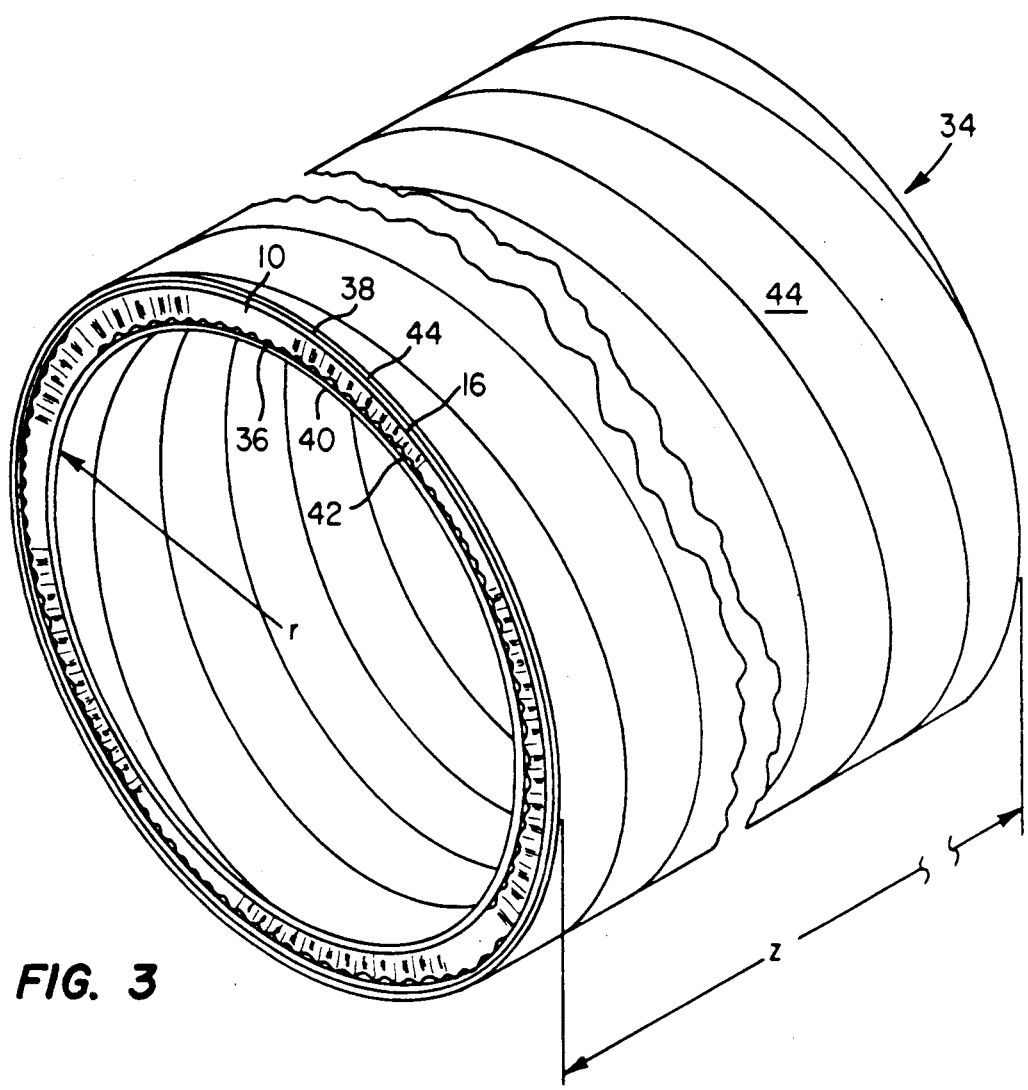
FIG. 3 is an isometric view of a cylindrical structure formed in accordance with the present invention.

Referring to FIG. 3, an isometric view of a double-walled cylindrical structure formed from the nested honeycomb structure 10 is generally identified by the reference numeral 34. The structure 34 may have a length z and a radius r of any appropriate dimensions. The structure 34 comprises an inner first wall 36, the nested honeycomb structure 10 and an outer second wall 38. The inner first wall 36 comprises a liquid impervious corrosion preventing layer 40 which may comprise gel coat and a fiberglass mat 42, as will be subsequently described in greater detail. The outer second wall 38 comprises a relatively thick skin 44 adhered to the relatively thin skin 16 of the structure 10 to provide hoop strength to the structure 34. Although not shown, it is to be understood that many other structures may be formed from the nested honeycomb structures 10 with equal efficiency.

Figure 4B:
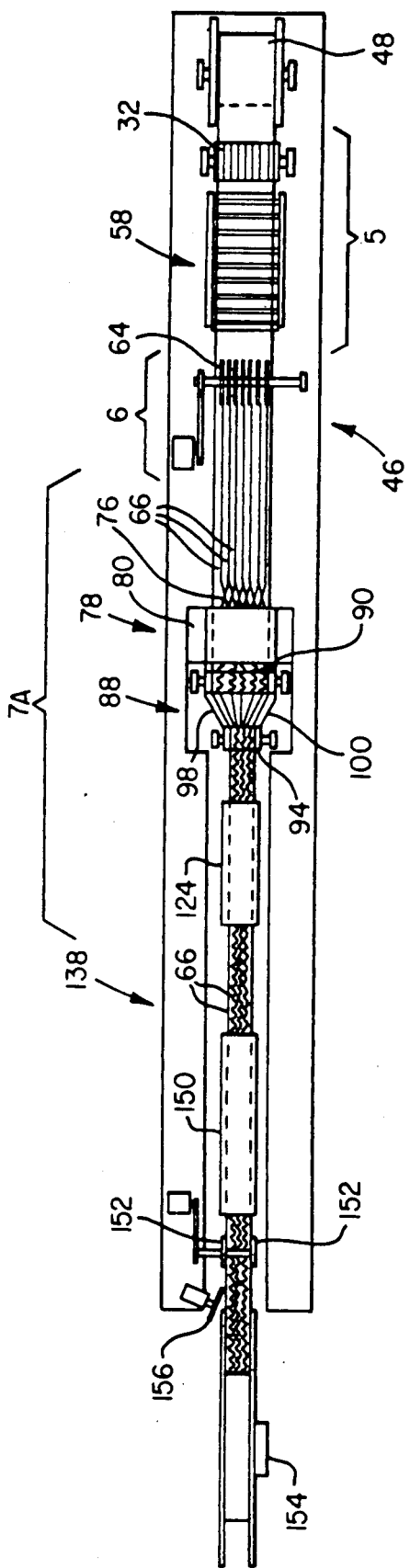
FIGS. 4A-B are views of an apparatus for forming the nested honeycomb structure of the present invention.
Figure 4A:
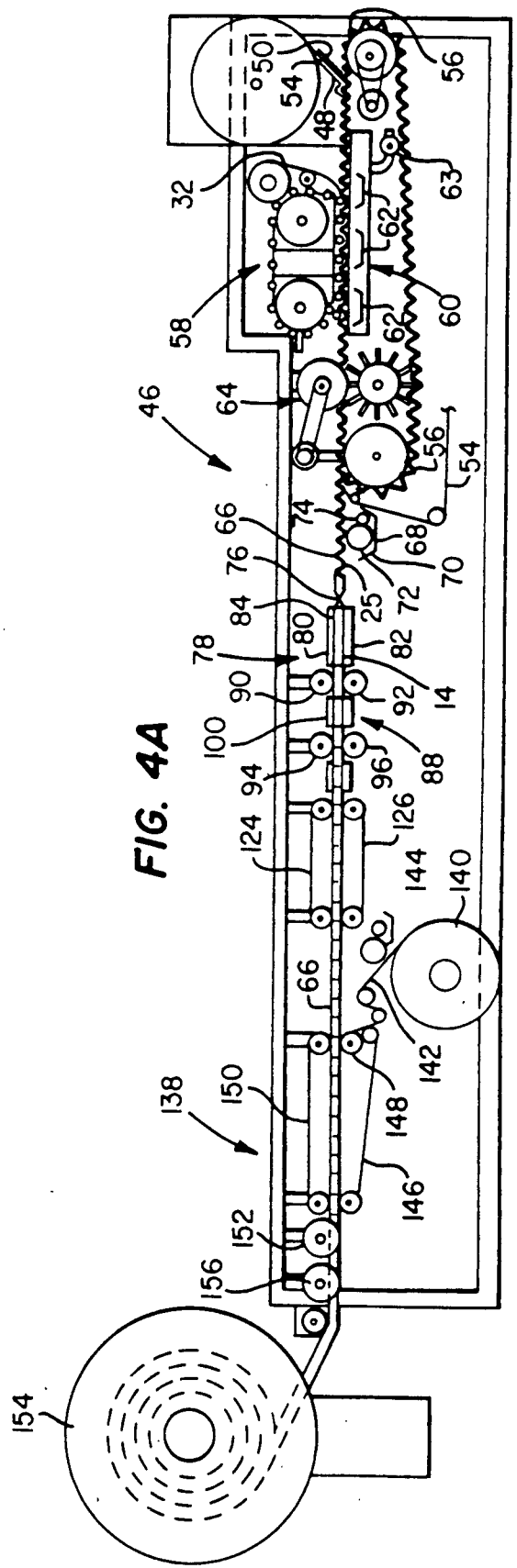

Referring simultaneously to FIGS. 4A and 4B, a simplified schematic view of an apparatus for manufacturing the nested honeycomb structure 10 is generally identified by the reference numeral 46. A continuous web 48 of porous fibrous core material, such as fiberglass, is fed to the apparatus 46 along a plate 50 by an apparatus for producing core material such as is well known in the art. The web 48 is saturated with a thick, syrupy resin and is supported by an endless loop belt 54 which preferably comprises a non-stick material such as "TEFLON". The web 48 merges with a corrugating belt 56 which is designed to provide the web 48 with the shape of the sinusoidal wave 20 (FIG. 2).

While the web 48 is still wet from the previously applied resin, the positioning string 32 is applied by a positioning apparatus 58, as will be subsequently described in greater detail. The positioning string 32 is placed over the web 48 in order to provide guides for the subsequent nesting of the waves 20. The string 32 rests on the peaks 22 and sags into the valleys 24, the depth of which may be adjusted by the positioning apparatus 58.

Although not shown, it is to be understood that various other means may be utilized to provide a guide for the nesting of the waves 20. For example, a contoured foam strip or a fiber blanket may be substituted for the string 32. The foam or fiber would be preformed to approximately fill the space that would have been left open between the waves 20 without detrimentally affecting the flexibility of the structure 10. In addition, a foam or fiber may provide an added benefit of improved insulation. It may also be possible to form the nested configuration of the present invention without the addition of any string, foam or fiber due to the special arrangements of the apparatus 46, as will be subsequently described in greater detail.

The web 48 undergoes a drying process in a curing section generally identified by the reference numeral 60. Curing of the web 48 may be by heat, such as from heat lamps 62 and by suction, such as by a vacuum pump 63.

Subsequent to curing, the web 48 is cut into predetermined widths by slitting means 64. The web 48 may be cut into a plurality of strips 66 of any desired width such as one to four inches. The positioning apparatus 58 thus would have installed a positioning string 32 along a longitudinal axis of each strip 66 at an approximate midpoint thereof, i.e., a four-inch wide strip would have a string 32 two inches from each edge. Although not shown, the slitting means 64 may also include a vacuum system to control dust created by the slitting of the fiberglass fibers.

Prior to proceeding to a gluing station 68 for gluing of the strips 66, the support belt 54 and the corrugating belt 56 separate from the strips 66 and return along their individual loops for additional processing of fiberglass. The gluing station 68 comprises a glue pan 70, a pickup/applicator roll 72 and a metering roll 74. The roll 72 applies an adhesive to the bottom 25 of the valleys 24 of the strips 66 directly opposite the strings 32 to allow adhesion thereto during the nesting to follow.

The strips 66 are then twisted 90 degrees about their longitudinal axis by guides which are indicated at a point 76. The guides 76 may be of any appropriate construction such as are well known in the art. The plurality of strips 66 then enter a leveling section 78 which comprises an upper plate 80 and a lower plate 82. The plates 80 and 82 ensure the strips 66 are positioned uniformly about their first edges 14 and their second edges 84 before proceeding to the next station.

The strips 66 then enter an indexing section 88 which comprises a first set of indexing rolls 90-92, a second set of indexing rolls 94-96 and guide plates 98 and 100. The indexing section 88 ensures that the sinusoidal waves 20 are properly indexed for nesting with respect to each strip 66, as will be subsequently described in greater detail.

The nested strips 66 then proceed to a sheet applicator section 138 which applies the relatively thin skin 16 for ease of handling. The sheet applicator Section 138 includes a roll 140 of a web 142 of fibrous material such as fiberglass which comprises the skin 16. Resin is applied to the web 142 by a resin applicator 144 to allow the web 142 to be "wet" for application to the nested strips 66. The "wet" web 142 is supported by a courier belt 146 which may preferably comprise a "TEFLON" coated belt. The courier belt 146 carries the web 142 to a position directly under and aligned with the nested strips 66 and over a pressing roller 148. The pressing roller 148 provides sufficient support for the web 142 to initially mesh with the nested strips 66.

The strips 66 and the meshed web 142 then enter a pressure and curing section 150 wherein the strips 66 are embedded into the web 142 to a depth of between 0.030 and 0.050 inches. The section 150 comprises appropriate belts and rollers sufficient to place enough pressure on the strips 66 and the web 142 to ensure the desired depth of penetration is maintained until the resin has dried. The web 142 may then be trimmed by slitters 152 to remove any excess width beyond the peaks 22 and valleys 24 of the strips 66 to form the structure 10. The structure 10 is then wound to a predetermined length onto a reel 154 for subsequent use. Since is possible to predetermine the exact length of the structure 10 required to form a cylindrical structure, such as the structure 34 (FIG. 3), and, therefore, diagonal cutting blades 156 may be used to properly cut the structure 10 to prevent waste during the spiral winding thereof by preventing the need to trim the ends of the structure 34.

Due to the indexing section 88 and the proximity thereof to the sheet applicator section 138, it is possible to form the nested fiberglass structure 10 without the use of any positioning guides such as the positioning string 32. The indexing section 88 can nest the strips 66 which will then be approximately maintained in their proper configuration by the subsequent application of the web 142.

Figure 5:
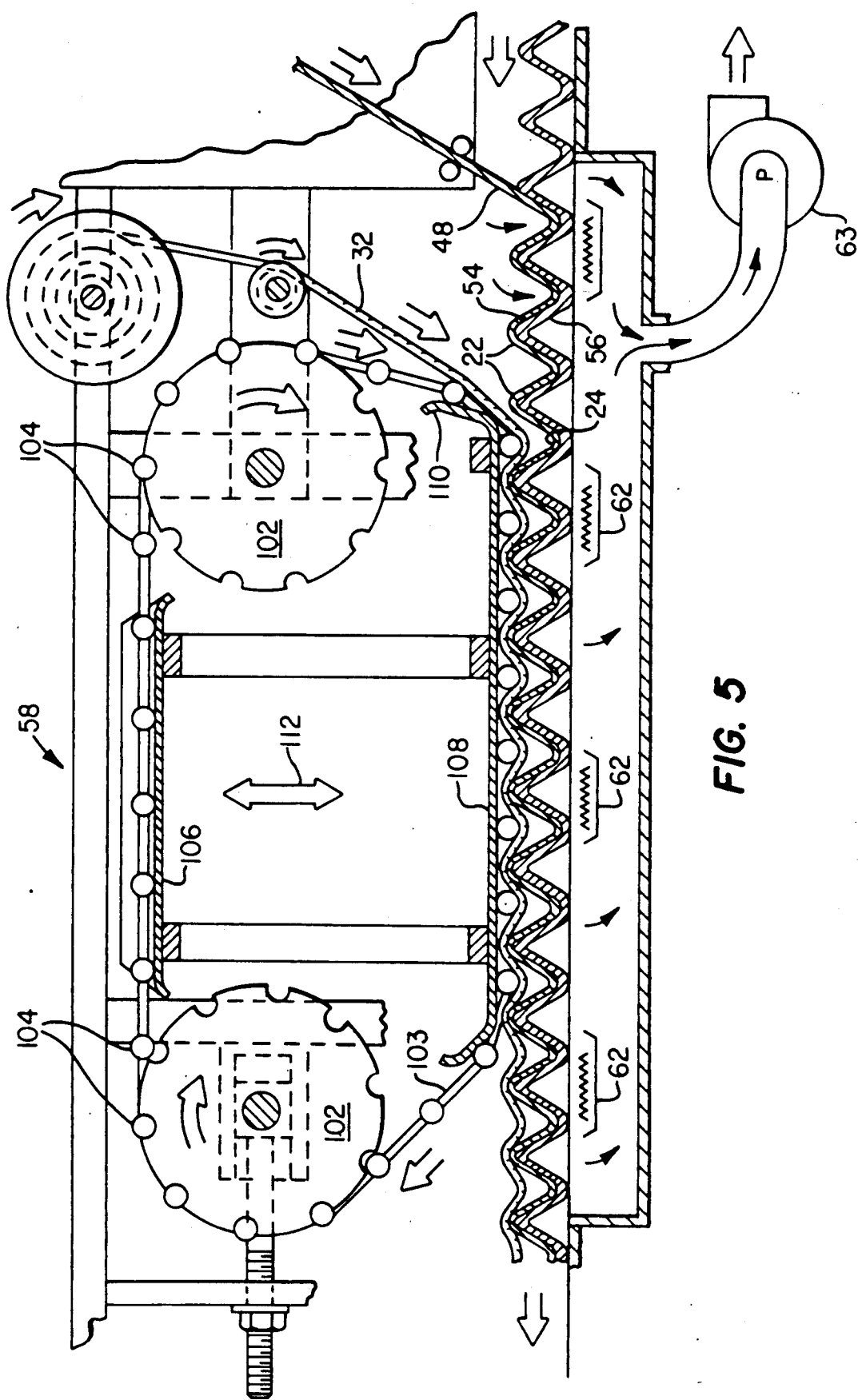
FIG. 5 is a more detailed view of section 5—5 of FIG. 4.

Referring to FIG. 5, the positioning means 58 is shown in greater detail. The positioning means 58 comprises a pair of sprockets 102 which are constructed and arranged to receive rollers 104. The rollers 104 are connected together by any appropriate means such as a chain 103 and are spaced apart a distance exactly corresponding to a distance between two consecutive valleys 24. The rollers 104 travel within upper guide channels 106 and lower guide channels 108. The lower guide channels 108 further comprise entrance chutes 110 which provide an abrupt merging angle for the positioning string 32 with the peaks 22. Without the entrance chutes 110, there could be some sliding between the string 32 and the web 48 which would destroy the proper positioning therebetween.

As the web 48 and the rollers 104 merge, the positioning string 32 is applied to the peaks 22 while the rollers 104 place the string 32 at the proper depth within the valleys 24. The depth of the placement of the string 32 within the valleys 24 may be raised or lowered by slidably moving the entire positioning means 58 up or down along arrow 112 about adjustable brackets (not shown). As the web 48 and the positioning string 32 leave the positioning means 58, the rollers 104 are withdrawn from the string 32 within the lower guide channels 108 about the sprockets 102.

Figure 6:
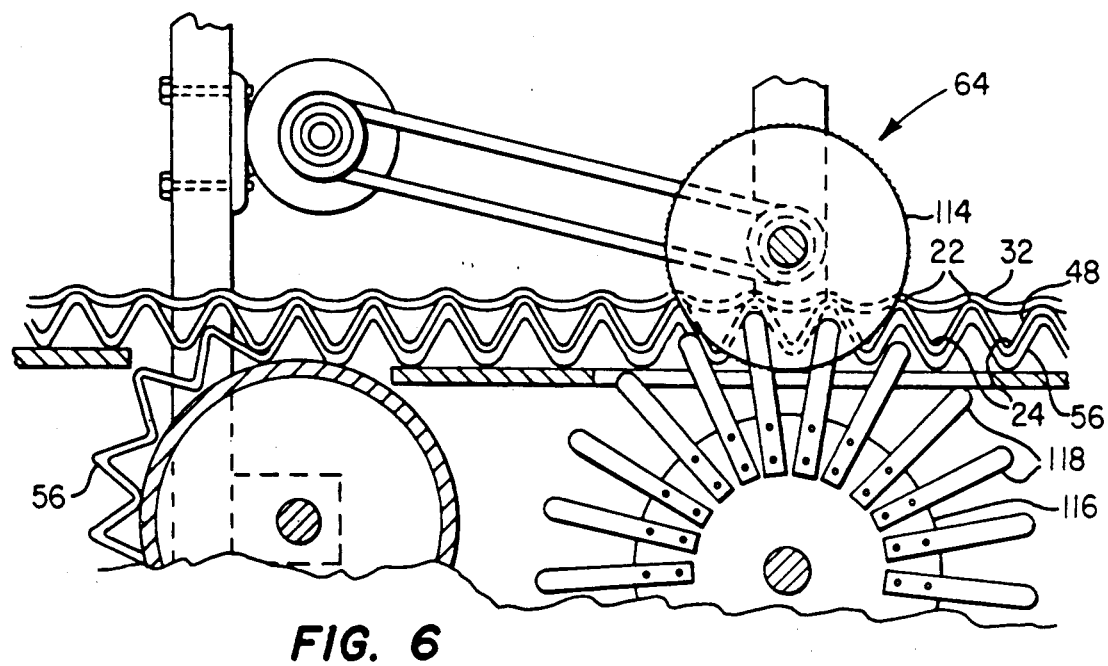
FIG. 6 is a more detailed view of section 6—6 of FIG. 4.

Referring to FIG. 6, the slitting means 64 of FIG. 4 is shown in greater detail. The slitting means 64 comprises a plurality of slitting wheels 114 which are appropriately spaced to cut the web 48 into the strips 66. Located below the slitting wheels 114 is a plurality of star wheels 116 which provide support to the web 48 during the slitting operation. The star wheel 116 has extensions 118 emanating therefrom to fit within the peaks 22 and between the valleys 24 of the web 48. Although not shown, it is to be understood that the corrugating belt 56 would be provided with appropriately spaced openings therethrough to allow the slitting operation to occur. Alternatively the slitting means 64 could be located beyond the end of the corrugating belt 56 to eliminate the need for the spaced openings therein. Obviously, the slitters 114 would be appropriately driven by drive means and supported by frame members.

Referring simultaneously to FIGS. 7A and 7B, the indexing section 88 of FIG. 4 is shown in greater detail. The strips 66 enter the section 88 from the leveling section 78 about first edges 14 and second edges 84. The strips 66 are then indexed by the first set of indexing rolls 90 and 92 to align the sinusoidal waves 20 for a subsequent nesting without the strips 66 being actually nested or adhered together.

The properly indexed but spaced strips 66 pass between guide plates 98-100 which channel the individual strips 66 somewhat closer together. The strips 66 then enter the second set of indexing rolls 94 and 96 which again insure that the sinusoidal waves 20 are properly positioned relative to each other for nesting and simultaneously adheres the individual strips 66 together by the strings 32 and the bottoms 25 of the valleys 24 to form a panel 122. The panel 122 is then fed by belts 124 and 126 to further processing such as the addition of the relatively thin skin 16 to facilitate handling of the completed structure 10 and winding onto a reel 154 for fabrication into other devices, as previously described above.

Referring to FIGS. 7C and 7D, one of the rolls 90-96, for example roll 90, is partially shown. The roll 90 has a plurality of patterned channels 128 for receiving the sinusoidal waves 20 of each strip 66. The channels 128 are aligned peak to peak and valley to valley with each other to match the desired nesting pattern of the structure 10. The channels 128 are adjustably spaced from each other, by any appropriate means not shown, to ensure the proper spacing between the strips 66. The channels 128 for the indexing rolls 90 and 92 are positioned identically to place the first edge 14 and the second edge 84 of each strip 66 in vertical alignment and are arranged to keep the strips 66 aligned but not touching. However, the channels 128 for the indexing rolls 94 and 96 (also positioned identically to each other) are positioned closer together to allow adhering of the strips 66 by the strings 32.

Referring to FIG. 7D, the channel 128 of FIG. 7C is shown in cross-section. The channel 128 has a central receiving portion 130 within which rests the second edges 84 of the strips 66. The channels 128 have outwardly angled sidewalls 132 and 134 to facilitate receipt of the edges of the strips 66. Thus the indexing rolls 90-96 receive the strips 66 by the first edge 14 and the second edge 84 and properly space and align the strips 66 for the nesting configuration required for the finished structure 10.

Figure 8:
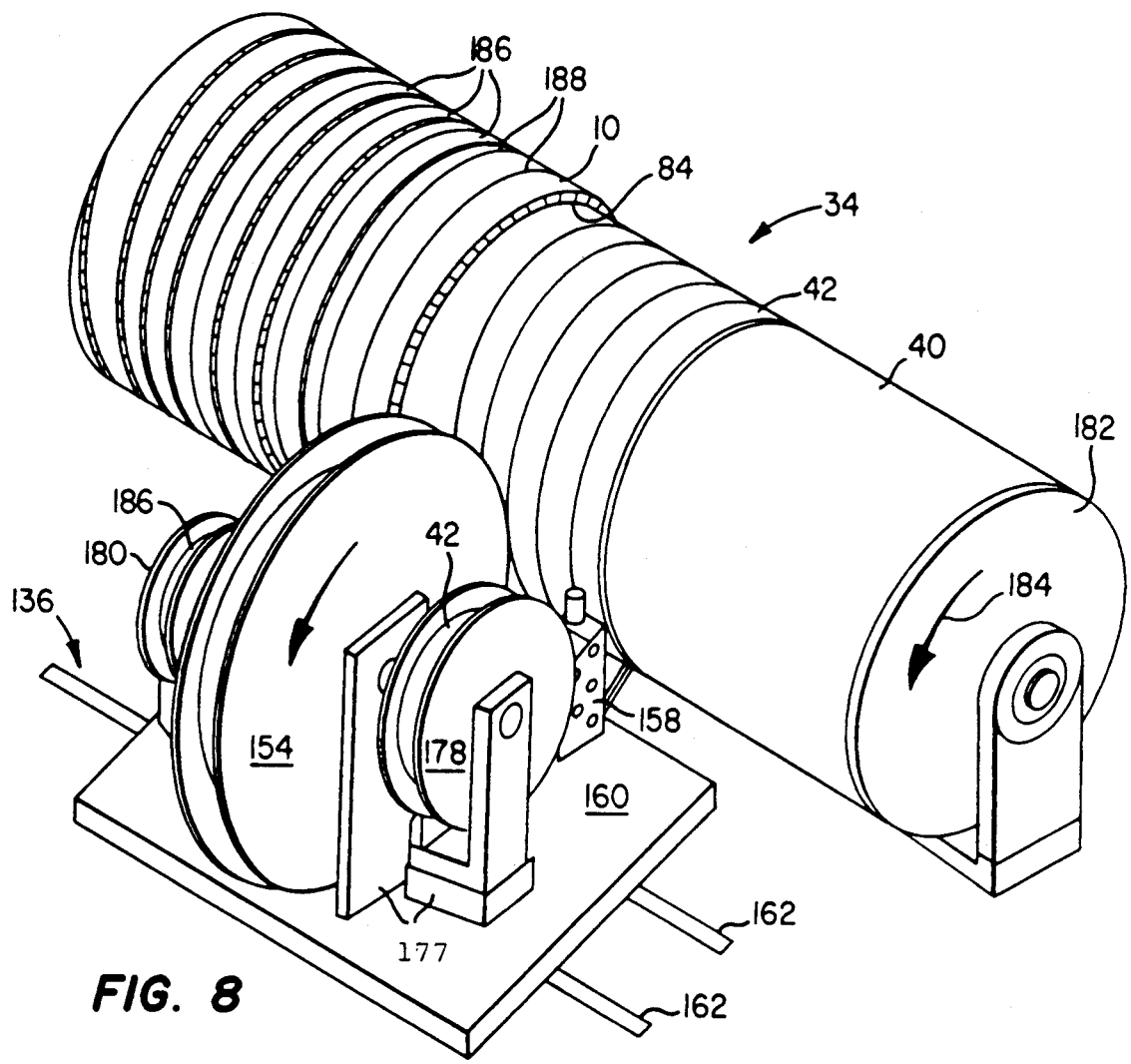
FIG. 8 is an isometric view of a wrapping apparatus used to form the cylindrical structure of FIG. 3.
Figure 9:
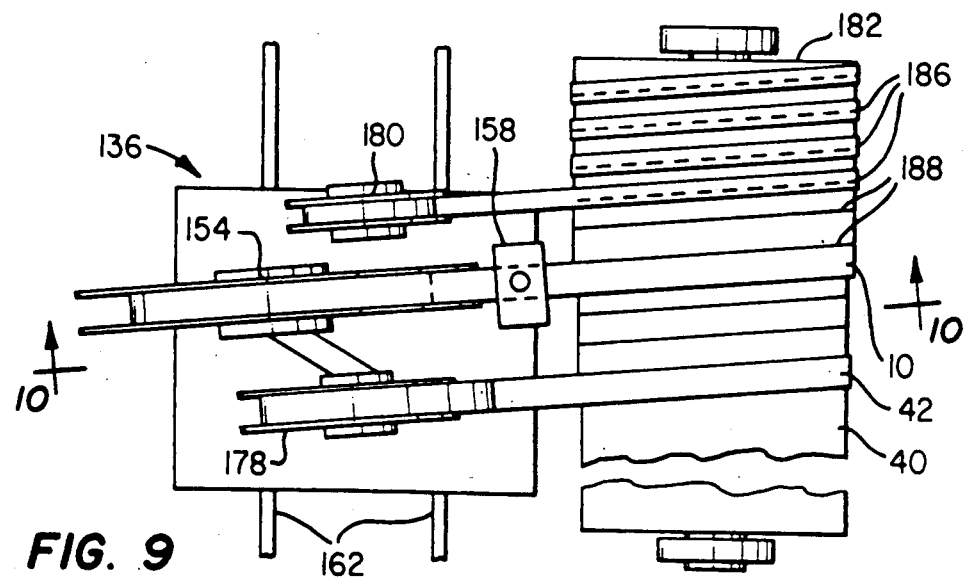
FIG. 9 is a top plan view of the wrapping apparatus of FIG. 8.
Figure 10:
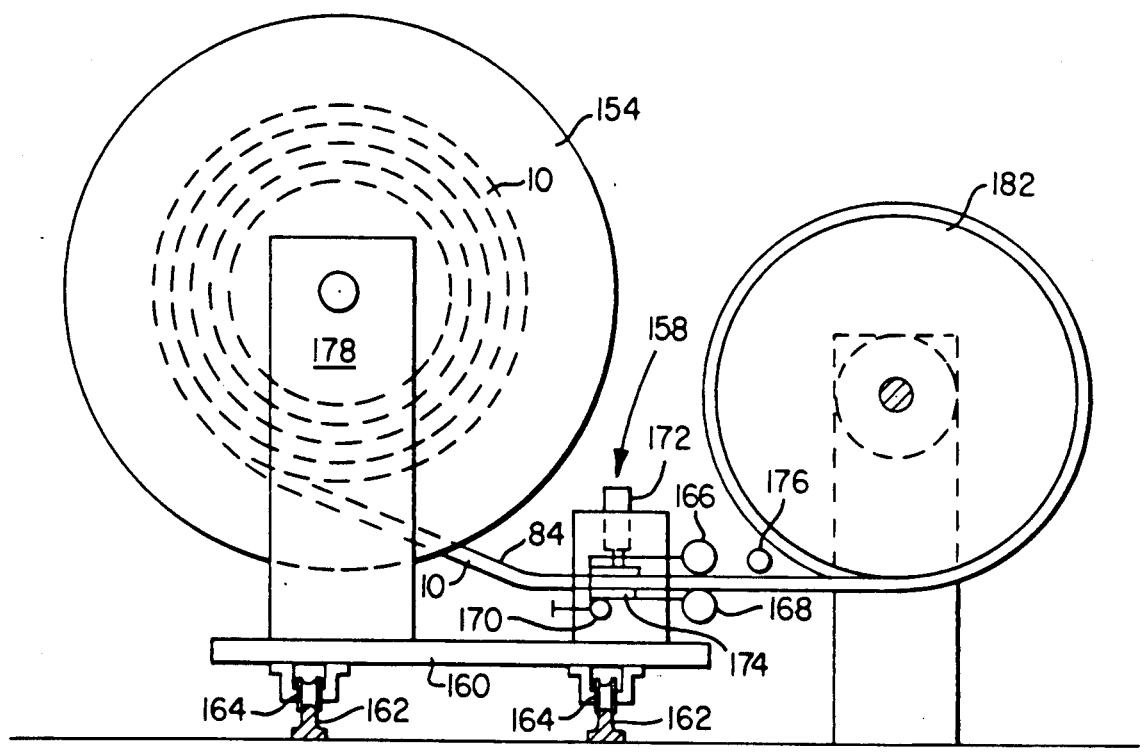
FIG. 10 is a sectional view along the line 10—10 of FIG. 9.

Referring simultaneously to FIGS. 8 and 9, views are provided of an apparatus 136 used to form the cylindrical structure 34 of FIG. 3. The apparatus 136 comprises a web tensioning device 158 mounted on a frame 160. The frame 160 is slidably movable along rails 162 by wheels 164 (FIG. 10).

Mounted on the frame 160 is a reel carrier 177 for carrying a reel 154 of the nested honeycomb structure 10, a reel 178 of the bonding mat 42 and a reel 180 of a rubber banding material 186. As shown, the reels 154, 178 and 180 are positioned at an angle with respect to the frame 160 while the rails 162 are parallel thereto in order to provide the spiral wind required to form the cylindrical structure 34.

A collapsible mandrel 182 is driven (by means not shown) in a counter-clockwise direction as indicated by an arrow 184. The mandrel 182 has previously been coated with a layer 40 of a gel coat to an approximate thickness of 0.040-0.050 inches. The bonding and reinforcing mat 42 from the reel 178 is then applied to the layer 40 in a spiraled configuration. The bonding and reinforcing mat 42 comprises a fiberglass sheet soaked in a resin material by any appropriate means (not shown) prior to its application to the layer 40. The mat 42 may be between ⅛-3/16 inch thick.

Immediately behind the application of the bonding and reinforcing mat 42, the reel 154 spirally wraps the structure 10. The tensioning device 158 insures that the proper pressure is applied to the structure 10 during its application to the mat 42 to embed the second edge 84 thereof approximately 0.030 to 0.050 inches into the mat 42. It is to be understood that the structure 10 could be applied during a second pass of the reel carrier 178 after the mat 42 has been completely applied.

Immediately behind the application of the structure 10, the reel 180 applies the rubber banding material 186 to the seams 188 between the spirals of the structure 10. It is necessary to apply the rubber banding material 186 to the seams 188 between the spirals of the structure 10 due to the tendency of the structure 10 to "pucker" or bow outwardly away from the mat 42 at the seams 188. The rubber banding material 186 is applied at a proper tension by a rubber banding tension device (not shown) affixed thereto.

After the structure 10 has cured on the mandrel 182, the rubber banding material 186 is removed and the relatively thick outer skin 44 is applied over the relatively thin skin 16 in a spiral directly opposite the spiral of the structure 10. The spirals are opposite to prevent alignment of seams between the skin 44 and the seams 188 between the structure 10. The skin 44 is applied by a filament winding machine, not shown, as is well-known in the art, in strips between 1-1.5 inches wide. Once the skin 44 has been allowed to dry, the mandrel 182 is collapsed radially inwardly upon itself allowing the completed structure 34 to be removed for use or for further processing as required.

Referring to FIG. 10, the web tensioning device 158 comprises a first rubber roller 166 and a second rubber roller 168 between which travels the structure 10. The rubber rollers 166-168 are linked together by any appropriate means such as chains and sprocket (not shown) to allow control of their speed of rotation by a disc brake 170.

The rubber rollers 166-168 may be brought closer together depending upon the height of the structure 10 by the action of an air cylinder 172. The air cylinder 172 may pull the second rubber roller 168 closer to or farther from the first rubber roller 166 by the action of a bracket 174. The disc brake 170 is preset to provide a predetermined amount of tension in conjunction with a driven mandrel 182 on the structure 10 as it passes between the first and second rubber rollers 166-168. It has been found that approximately 300 pounds of tension is sufficient to apply approximately 40-50 pounds per square foot (psf) of pressure to the structure 10. This pressure (40-50 psf) is necessary to ensure the proper depth of penetration of the second edges 84 of the structure 10 into the mat 42 which forms part of the inner first wall 36. If the air cylinder 172 detects excessive tension, the brake 170 is released slightly. If the cylinder 172 detects insufficient tension, the brake 170 is activated to slow the rollers 166-168. Subsequent to the tensioning device 158, there may be an optional edge gluer indicated by a roll 176 to apply glue to the second edge 84 of the structure 10 if necessary.

In operation, a continuous web 48 of saturated porous fibrous material such as fiberglass is corrugated into a sinusoidal wave 20. The wet web 48 is merged with the positioning strings 32 which are placed across the peaks 22 and into the valleys 24 therebetween.

The web 48 with the strings 32 thereon is dried by passing over the curing section 60. The dried web 48 is then cut into strips 66 of an appropriate width by the slitting means 64. The strips 66 then have glue applied to the bottoms 25 of the valleys 24 and are twisted 90° about their longitudinal axes.

The strips 66 enter the leveling section 78 on their first edges 14. After the leveling section 78, the strips 66 enter the indexing section 88 which ensures the individual strips 66 are properly positioned for nesting to form the structure 10.

After exiting the indexing section 88, the nested strips 66 proceed to the sheet applicator section 138 which applies the relatively thin skin 16 to the first edge 14. The skin 16 is trimmed by the slitters 152 and subsequently wound onto the reel 154 for further fabrication of additional structures as required.

The reel 154 may then be placed onto the apparatus 136 for fabrication of the cylindrical structure 34. The apparatus 136 wraps the structure 10 spirally around the mandrel 182. Concurrently with the application of the structure 10 to the mandrel 182, the rubber banding material 186 is applied from the reel 180 over the seams 188 between the structures 10. After the structures 10 have cured on the madrel 182, the rubber banding material 186 is removed and a relatively thick skin 44 is spirally wound opposite to the spiral of the structure 10 to form the outer second wall 38 with the relatively thin skin 16.

While the structure 10 has been described with respect to a sinusoidal wave 20, it is to be understood that other wave forms could be used. As long as the waves of one strip are capable of being nested within at least parts of the peaks and valleys of the adjacent strip, the structure formed will have some of the desired strength and flexibility characteristics of the present invention. Therefore, such non-uniform waves are also contemplated by this invention.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A fiberglass structure, comprising:
   at least two corrugated strips positioned in a face-to-face manner and spaced between their ends, wherein peaks and valleys of each said strip extend into peaks and valleys of adjacent strips, wherein said strips, between said peaks and valleys, have a substantially straight line forward slope and a substantially straight line reverse slope; and
   a relatively thin skin comprising a fibrous material into which one edge of each of said strips is embedded, wherein said embeddedness improves the shear strength of the structure.

2. The structure of claim 1, wherein said corrugated strips comprise fiberglass strips of a generally sinusoidal shape.

3. The structure of claim 2, wherein said sinusoidal shape comprises said peaks and valleys of uniform amplitude about a central longitudinal axis.

4. The structure of claim 1, wherein said strips have a cell height equal to a distance from said peaks to a bottom of said valleys and said peaks and valleys extend into said adjacent peaks and valleys between 10%-60% of said cell height.

5. The structure of claim 4, wherein said peaks and valleys have a radius of curvature equal to less than 30% of said cell height.

6. The structure of claim 1, wherein an angle formed between outward projections of said substantially straight line slopes is less than 80°.

7. The structure of claim 1, further comprising a positioning means between said strips.

8. The structure of claim 7, wherein said positioning means comprises a non-stretachable string over said peaks and into said valleys.

9. The structure of claim 7, wherein said positioning means comprises a contoured foam strip.

10. The structure of claim 7, wherein said positioning means comprises a fiber blanket.

11. The structure of claim 1, wherein said relatively thin skin comprises a fiberglass sheet.

* * * * *